United States Patent [19]

Baker

[11] Patent Number: 5,059,070

[45] Date of Patent: Oct. 22, 1991

[54] TWO-EDGE THREADING MILLING INSERT

[75] Inventor: Brian Baker, Lake Orion, Mich.

[73] Assignee: GTE Valenite Corporation, Troy, Mich.

[21] Appl. No.: 631,123

[22] Filed: Dec. 20, 1990

[51] Int. Cl.$^5$ .............................................. B23P 15/28
[52] U.S. Cl. ..................................... 407/114; 407/42; 407/48; 407/115; 407/61
[58] Field of Search ............... 407/114, 116, 113, 115, 407/117, 48, 53, 61, 42; 408/215

[56] References Cited

U.S. PATENT DOCUMENTS

| | | | |
|---|---|---|---|
| 1,701,775 | 2/1929 | Hall | 408/215 |
| 4,531,863 | 7/1985 | Smith | 407/113 |
| 4,531,864 | 7/1985 | Bylund | 407/114 |
| 4,993,893 | 2/1991 | Niebauer | 407/114 X |

Primary Examiner—Gary F Paumen
Assistant Examiner—Julie R. Daulton
Attorney, Agent, or Firm—Bill C. Panagos

[57] ABSTRACT

A thread cutter milling tool that includes a cutter body having two sets of cutter teeth. The cutter body is reversibly mountable on a holder so that either set of teeth is presented to the work. Each set of teeth is formed in an edge of the cutter body that is recessed to form a cutter surface and a chip breaker surface. Each chip breaker surface has a dual action for breaking chips and also for locating the cutter body on the holder.

2 Claims, 1 Drawing Sheet

U.S. Patent
Oct. 22, 1991
5,059,070
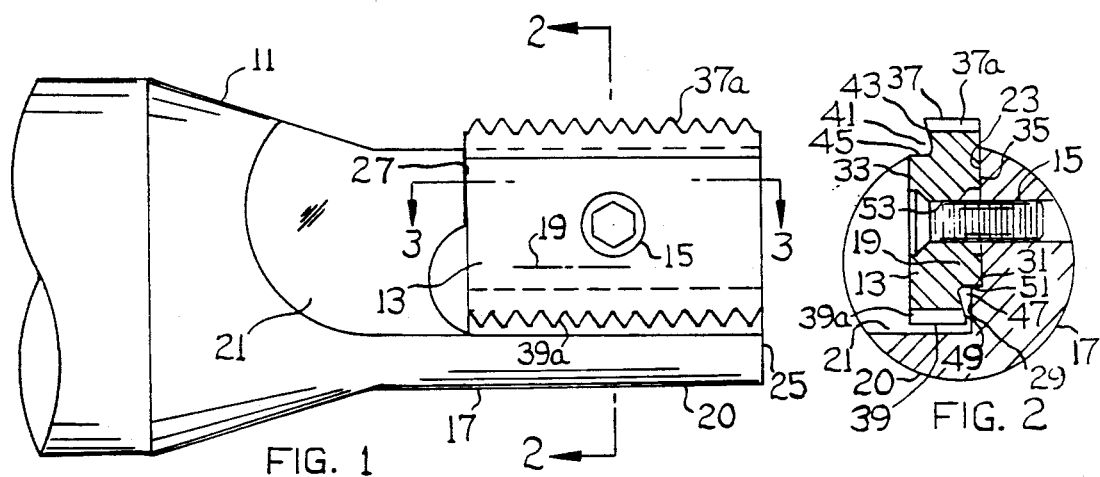
FIG. 1
FIG. 2
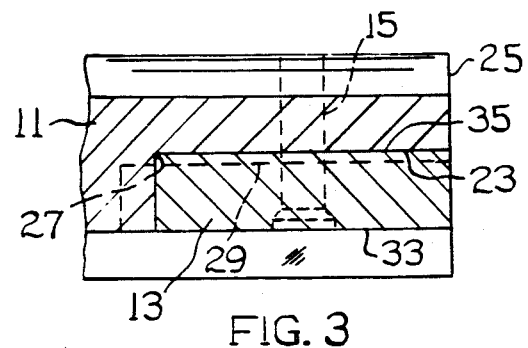
FIG. 3

TWO-EDGE THREADING MILLING INSERT

BACKGROUND AND SUMMARY OF THE INVENTION

This invention relates to a thread cutter milling tool usable to form internal or external screw threads on a workpiece. The principal feature of the invention is the fact that the cutter body (insert) has two sets of cutter teeth oriented symmetrically to the central axis of the cutter body, whereby the useful life of the cutter is essentially doubled. The cutter body can be oriented with either set of cutter teeth presented to the work surface.

Each set of cutter teeth is formed by a series of serrations in a longitudinal edge surface of the cutter body. Recesses are formed at the junctures between the major faces of the cutter body and respective ones of the serrated edges on the cutter body. Each recess forms a cutter surface set back from the associated major face of the cutter body; each recess also forms a chip breaker surface extending generally transverse to the respective major face of the cutter body.

The respective chip breaker surfaces are symmetrical to the central longitudinal axis of the cutter body, whereby the cutter body can have two different positions of adjustment on the associated shoulder, with one of the chip breaker surfaces presented to the work for chip breaker action, and the other chip breaker surface being engaged with a longitudinal shoulder formed on the holder for rigidly orienting (positioning) the cutter body on the holder.

A major feature of the invention is the recess construction in the cutter body whereby either one of the chip breaker surface can perform a chip breaker function while the other chip breaker surface acts as a cutter body orientation device. The non-cutting cutter surface faces away from the work so that it is protected from possible damage by the chips during normal machine operation.

In some respects the tool of this invention is similar to a tool shown in U.S. Pat. 4,531,863 issued to Smith. The Smith patent shows a cutter body (insert) having multiple sets of cutter teeth and intervening flat surfaces, whereby the cutter body can have different orientations on the associated holder. The Smith patent however does not show the use of chip breaker surfaces as orientation devices for the cutter body.

THE DRAWINGS

FIG. 1 is a fragmentary side elevational view of a thread cutter milling tool embodying this invention.

FIG. 2 is a transverse sectional view taken on line 2—2 in FIG. 1.

FIG. 3 is a fragmentary sectional view taken on line 3—3 in FIG. 1.

DESCRIPTION OF A PREFERRED EMBODIMENT OF THE INVENTION

The drawings show a thread cutter milling tool that includes an elongated holder 11 and a cutter body 13 removably mounted on the holder. A single screw 15 is extended through a central hole 53 in cutter body 13 to clamp the cutter body to holder 11.

The illustrated holder comprises a cylindrical shank 17 having a longitudinal axis 19 that forms the center for a cylindrical side surface 20 on the shank. The cylindrical shank has a side portion thereof cut away, as at 21, to form a first flat 23 extending parallel to axis 19 from right end 25 of the shank to a point 27 spaced along the shank length. A second flat 29 extends generally parallel to flat 23 but offset in the transverse direction (to the left in FIG. 2). The two flats 23 and 29 are interconnected by a transverse surface 31 that forms an exposed shoulder extending longitudinally along the shank This shoulder surface 31 acts as a locator surface for cutter body 13.

The elongated cutter body has two flat major faces 33 and 35 and two longitudinal edge surfaces 37 and 39. Each edge surface is serrated to form cutter teeth, designated by numerals 37a and 39a.

A first longitudinal recess 41 is formed in the cutter body at the junction between flat face 33 and edge surface 37 This recess forms a cutter surface 43 set back from major face 33, and a chip breaker surface 45 extending generally normal to major face 33.

A second longitudinal recess 47 is formed in the cutter body at the juncture between flat face 35 and edge surface 39. This second recess forms a second cutter surface 49 set back from major face 35, and a chip breaker surface 51 extending generally normal to major face 35.

As shown in FIG. 2, the cutter body is positioned with its flat major face 35 positioned flatwise against flat 23 of the holder; chip breaker surface 51 is seated against shoulder 31 so that the cutter body is prevented from shifting on the holder. Screw 15 extends through a smooth surfaced hole 53 in cutter body 13 into a threaded hole in shank 17, whereby the cutter body is rigidly clamped to holder 11. In the position shown in FIG. 2 cutter teeth 37a are in operating position for forming threads on a workpiece.

The cutter body can have a reversed position wherein its flat major face 33 is engaged flatwise against flat 23, and chip breaker surface 45 is seated against shoulder 31. Teeth 39a are then in an operating position for cutting threads on a workpiece.

The smooth surfaced hole 53 is located equidistant from chip breaker surfaces 45 and 51, so that the single hole can be used to accept the clamp screw 15 in either position of the cutter body.

The advantage of the illustrated construction is that the useful life of the cutter body is essentially doubled because the cutter body can be reversed to present either set of teeth to the work. The principal feature of the invention is the recess construction (at 41 and 47) whereby each chip breaker surface serves the dual function as a chip breaker and as a cutter body locator means. I am not aware of any thread cutter tools wherein a chip breaker surface has such a dual action.

I claim:

1. A thread cutter milling tool comprising a holder having a longitudinal axis; said holder having a side portion thereof cut away to define a first flat extending parallel to the longitudinal axis, a second flat extending generally parallel to said first flat, and a transverse surface interconnecting the two flats to form a longitudinally extending shoulder; an elongated cutter body having two flat major faces and two longitudinal edge surfaces interconnecting said major faces; a first longitudinal recess formed in said cutter body at the juncture between one of said major faces and one of said longitudinal edge surfaces; said first recess defining a first cutter surface set back from said one major face, and a first chip breaker surface extending essentially normal to said one major face; said one edge surface being serrated to form first cutter teeth; a second longitudinal recess formed in said cutter body at the juncture between the other major face and the other longitudinal edge surface; said second recess defining a second cutter surface set back from said other major face, and a second chip breaker surface extending essentially normal to said other major face; said other edge surface being serrated to form second cutter teeth; said cutter body having a first position wherein said one major face has flatwise engagement against said first flat, and said first chip breaker surface has flatwise engagement against said shoulder; said cutter body having a second position wherein said other major face has flatwise engagement against said first flat, and said second chip breaker surface has flatwise engagement against said shoulder.

2. The milling tool of claim 1, and further comprising a hole extending transversely through the cutter body normal to its flat major faces; and a hold down a screw extendable through said hole into the holder to clamp the cutter body to the holder; said hole being equidistant from said first and second chip breaker surfaces whereby said hole is usable as a clamp mechanism in either position of the cutter body.

* * * * *